United States Patent [19]

Boivineau et al.

[11] Patent Number: 4,849,983
[45] Date of Patent: Jul. 18, 1989

[54] PROCESS AND APPARATUS FOR OBTAINING AN EXCIMER AND APPLICATION TO LASERS

[75] Inventors: Michel Boivineau, Les Ulis; Christophe Jouvet, Bourg la Reine; François Piuzzi, Cachan, all of France

[73] Assignees: Commissariat a l'Energie Atomique, Paris; Centre National de la Researche Scientifique, Quai Anatole, both of France

[21] Appl. No.: 135,143

[22] Filed: Dec. 18, 1987

[30] Foreign Application Priority Data

Dec. 24, 1986 [FR] France ............................... 86 18173

[51] Int. Cl.⁴ .......................... H01S 3/22; H01S 3/223
[52] U.S. Cl. .......................................... 372/57; 372/90
[58] Field of Search .............................. 372/55, 57, 90

[56] References Cited

U.S. PATENT DOCUMENTS 4,713,823 12/1987 Smith ...................................... 372/90
4,737,965 4/1988 Morr et al. ............................. 372/90

OTHER PUBLICATIONS

Appl. Phys. Lett., vol. 36, No. 3; "High Speed Power Long-Pulse Supersonic Flow XeCl Laser at 308mm"; Fontaine et al; Feb. 1980, pp. 185-187.
Optics Communications, vol. 52, No. 5; Jan. 1985; "An Optically Pumped Supersonic Iodine Beam Laser"; Hefter et al., pp. 330-335.
Sov. Phys. Usp., vol. 29, No. 1; Jan. 1986; pp. 31-56; "Condensed-and Compressed-Gas Lasers".

Primary Examiner—William L. Sikes
Assistant Examiner—B. R. R. Holloway
Attorney, Agent, or Firm—Pearne, Gordon, McCoy & Granger

[57] ABSTRACT

Process and apparatus for obtaining an excimer and application to a laser.

The apparatus comprises a compression chamber (9), compressor (11) for compressing the gaseous mixture $R+XY+M$ in the compression chamber (9), an expansion chamber (3) communicating at least one opening (23,23a) with the compression chamber (9), a vacuum pump (25) for producing within the expansion chamber (3) a pressure well below that prevailing in the compression chamber (9), the pressure difference between the compression and expansion chambers, the surface of the opening and the volume of the compression chamber being such that the gaeous mixture entering the compression chamber undergoes a supersonic adiabatic expansion with a Mach number at least equal to 10 and electrodes (27, 29, 27a, 29a) for producing an electric discharge (E) in the expansion chamber (3), downstream (x) of the opening (23, 23a) FIG. 2.

20 Claims, 3 Drawing Sheets

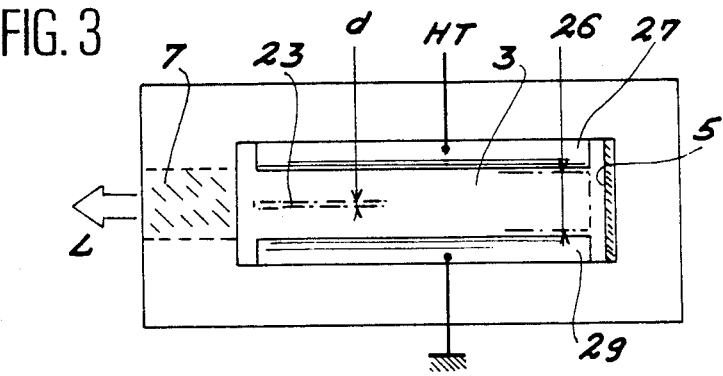
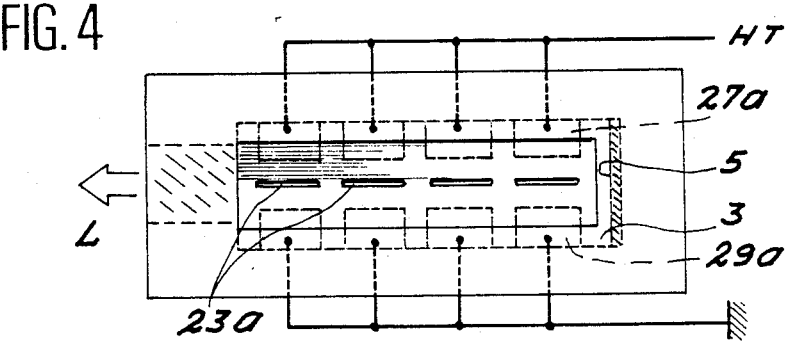
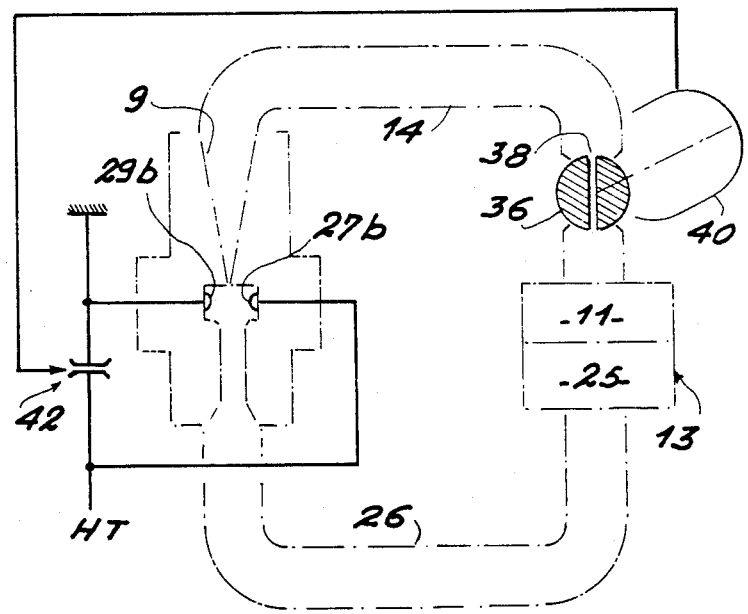

PROCESS AND APPARATUS FOR OBTAINING AN EXCIMER AND APPLICATION TO LASERS

BACKGROUND OF THE INVENTION

The present invention relates to a process and to an apparatus for obtaining an excimer usable as a light source, emitting in the ultraviolet or visible, in a pulsed laser with a high repetition rate or in a continuous laser.

The invention is applicable to lasers in general and more specifically to those with a high power and efficiency level, more specifically usable in the fields of photochemistry, telecommunications and controlled fushion.

The development of gas lasers of excimers in the field of visible and ultraviolet wavelengths has been the object of considerable interest over the last ten years. This is partly due to the great diversity of wavelengths and to the narrowness of the spectral range of laser emissions (a few nm).

An excimer is an excited chemical species in the gaseous state which, on deexciting or deenergizing, can be chemically dissociated during a light emission, the latter corresponding to an electronic transition between the excited state of the excimer and its very slightly bound normal state (approximately 100 to 300 cm$^{-1}$).

Due to the very fast chemical dissociation of the molecule in the normal state, the population inversion is easily realisable and the effective stimulated emission section has a high value (approximately $10^{-16}$ cm$^2$).

For a general description of the principles and characteristics of excimer lasers, reference can e.g. be made to the article by J.J. Ewing entitled "Excimer Lasers", published in Laser Handbook, edited by M.L. Stitch, North Holland Publishing Company 1979, pp. 135 to 197.

In excimer lasers, the active medium is constituted by a gaseous mixture R+XY, in which R generally represents a rare gas such as xenon, argon or krypton and XY generally designates a halogenated, diatomic gaseous molecule such as $CL_2$, $F_2$, HCL or HF. This active medium is immersed in a buffer gas constituted by a rare gas identical or different to R.

One of the gaseous reagents R or XY is excited or ionized either by optical pumping, or by electron bombardment, or by electric discharge and collision of the excited reagent with the other reactant produces a rare gas halide RY* in an excited state, which is the precursor of the laser emission.

The product RY* is mainly formed in two excited electron states called B and C, but the laser emission corresponds to the electron transition between level B and the normal level X. This laser emission mainly takes place as from the normal vibronic level of state B (v=0), populated by collisional relaxation of the excited states of B (v≠0) with the aid of the buffer gas.

The reaction mechanism can be diagrammatically shown as follows:

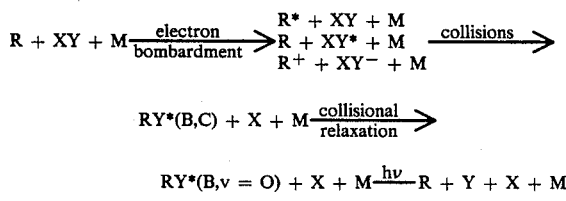

M being the buffer gas in which the mixture R+XY is immersed.

FIG. 1 shows the potential curves of XeCL corresponding to R=Xe and XY=CL$_2$. These curves, which represent the above reaction mechanism, have in particular been published in the article by P.J. Hay et al entitled "The covalent and sonic states of the xenon halides", published in J. Chem. Phys. 69, 1978, pp. 2209. These curves give the bond energy E, expressed in eV, as a functional of the distance of the bond r of XeCL, expressed in nm.

FIG. 1 gives the potential curve of the system XeCL. The excited state (curve 1) corresponds to the state Xe$^+$($^2P_{3/2}$) and CL$^-$. It can be gathered from curve 1 that the bond energy of the excimer XeCL*(B) is below those of Xe$^+$ and CL$^-$ which are not bound.

Curve 2 gives the bond energy of the xenon and chlorine molecules in the non-excited state.

The light emission symbolized by the arrow F is due to the deexcitation of the excimer XeCL* (B,v=0), which is accompanied by the dissociation of the latter into xenon and chlorine atoms in the non-excited state (curve 2). The wavelength of the light emitted is 308 nm.

One of the disadvantages of the presently known excimer lasers is their poor efficiency of approximately 1%, which is defined by the ratio of the laser energy extracted to the energy absorbed by the active medium during electron bombardment.

Another major disadvantage of these excimer lasers is the limited regeneration of the starting gas making it difficult to operate at high frequency and impossible to operate under continuous conditions. In particular, the recycling of the gas is generally performed by ventilators limiting the number of laser pulses per unit of time, the repetition rate of said lasers being approximately 100 Hz.

In order to increase the collision probability between the excited reagent (e.g. R*) and the other reactant (XY) and consequently obtain high laser powers, it is necessary for the reagents to have a high pressure (approximately 10$^4$Pa). In the same way, the buffer gas must have a high pressure (approximately 10$^5$Pa) in order to vibrationally relax the excimers formed.

Unfortunately it is difficult to control the production of an electric discharge for exciting one of the two reagents in a high pressure medium. Moreover, the voltages conventionally used for bringing about this discharge in an effective manner are high and range between 25 and 30 kV.

In order to obtain a higher gas flow and a constant replenishment of the active medium, a supersonic flow laser has been developed. The latter is more particularly described in the article by B. Fontaine et al entitled "Nouveaux lasers supersoniques à très basse tempeérature et haute densite", published in the journal of Cethedec 19, special number 1982.2, pp. 55–80 and in the article "Les lasers à excimères avec écoulement gazeux supersonique" by B. Fontaine et al, published in Entropie, no. 89–90, 1979, pp. 118–125.

In this device, the supersonic flow is obtained with a Laval nozzle and the electric discharge used for exciting one of the reagents R or XY is stabilized or assisted by an electron beam or X-ray. The reaction diagram is identical to that given hereinbefore.

Furthermore, the density of the gas (or pressure) in the supersonic flow must still be maintained high in order to assist collisions between the excited reagent and the other reagent and the relaxation of the species RY* (B,C). Unfortunately the cooling of the gas due to the supersonic expansion contributes to the formation of aggregates between the reagents, thus limiting the concentration of the reagents available for forming the excimer RY*.

In particular, in the case of a reactive mixture Xe+HCL, the formation of aggregates of $(HCL)_n$ is high, n being a positive integer exceeding 2. The disadvantage of these aggregates is more particularly described in Appl. Phys. Lett. 36(3) of 1.2.1980 by B. Fontaine and entitled "High specific power long-pulse supersonic flow XeCL laser at 308 nm", pp. 185–187.

The inventors have found that the formation of these aggregates of $(HCL)_n$ was due to the high polarity of the HCL molecule.

Other aggregates or homogenous complexes of type $R_2^+$ (e.g. $Xe_2^+$) are also produced via ion-molecule reactions, whose effective sections are very high under the temperature and pressure conditions of supersonic flow. These two effects limit the laser efficiency to approximately 2.5%.

In the aforementioned supersonic flow laser, the Mach number defining the gas flow rate varies from 1 to 3. This Mach number is relatively low so as to permit collisions between the reagents, necessary for obtaining the excimer. Thus, the number of collisions per unit of time p is a decreasing function of the Mach number: $p \sim M^{-4}$. Moreover, the use of an electron gun or an X-ray generator make the known supersonic flow lasers complex and therefore costly.

Hitherto every effort has been made to produce collisions between the reagents, in order to obtain a large number of excimers and therefore the maximum light power. However, contrary to the objective sought in the articles by B. Fontaine et al and contrary to all logic, the inventors have removed the collisions and sought to increase the number of Van der Waals complexes of the R-XY type in the gaseous mixture by increasing the Mach number of the supersonic flow and by using reaction mixtures formed by weakly polarized or non-polar molecules. Moreover, they have sought to directly excite these Van der Waals complexes. They have been able to obtain the emission of the excimer wtih a narrow spectral band (approximately 10 nm).

It should be noted that the formation of Van der Waals complexes ($Xe-Br_2$, $Xe-CL_2$) the optical excitation of these complexes forms the subject matter of a publication entitled "Formation of the XeBr* excimer by double optical excitation of the $Xe-Br_2$ Van der Waals complex" by M. Boivineau et al, published in J. Chem. Phys. 84(8) of 15.4.1986, pp. 4712–4713, but excitation of the complexes was then performed by a complex optical pumping device.

SUMMARY OF THE INVENTION

The present invention relates to a process and an apparatus for obtaining an excimer making it possible to obviate the aforementioned disadvantages. In particular, the apparatus used is relatively simple and inexpensive, not requiring the use of an electron gun or complex optical pumping for forming the excimer and it has a higher efficiency than that obtained in the prior art.

The invention firstly relates to a process for obtaining an excimer able to chemically dissociate during its deexcitation by a light emission, characterized in that it comprises the following stages:

compression of a gaseous mixture R+XY+M with R, XY and M being identical or different and in which R and XY are chosen from among a rare gas atom, a metal atom and a polyatomic molecule, M representing a buffer gas, supersonic adiabatic expansion of the compressed mixture with a Mach number at least equal to 10 leading to the formation of a Van der Waals complex R-XY immersed in the buffer gas, the bond energy of the complex being at least equal to the bond energy of R-R and XY-XY, and direct excitation of the Van der Waals complex by an unassisted electric discharge leading to the excimer RY*.

The use of a high Mach number of at least equal to 10 for the adiabatic expansion and therefore a very good cooling of the gaseous mixture (to a few degrees K) is essential for bringing about a high concentration of the complexes R-XY. Moreover, bearing in mind the very low density or pressure of the expanded gas in the region where the electric discharge occurs, this makes it possible to use a simple discharge, below 10 kV, which is not assisted or not stabilized electronically or by X-radiation, unlike in the prior art.

For reasons of ease of use and limited overall dimensions of the apparatus used for performing the process according to the invention, the electric discharge used is the transverse type, i.e. it is produced perpendicular to the flow of the gaseous mixture.

It is very surprising that the excitation of the complexes RY* by an electric discharge leads with a remarkable specificity to the formation of an excimer RY* (B,V≲10). Thus, the electric discharge is not a selective excitation process and many other products could have been formed and the reaction leading to he excimer need not have been produced.

The reaction mechanism according to the invention, simplified compared with that of the prior art, is diagrammatically represented as follows:

$$R + XY + M \xrightarrow{\text{supersonic expansion}} (R - XY) + M \xrightarrow{\text{electric discharge}}$$

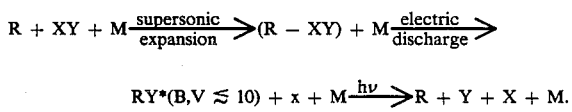

The process according to the invention is applicable to all the presently known reactive gases able to form a Van der Waals complex of type R-XY, whose bond energy is equal to or greater than that of complexes R—R and XY-YX. This is particularly the case for non-polar or very slightly polar R and XY atoms or molecules.

It should be noted that in the aforementioned documents of B. Fontaine, the formation of complexes $(HCL)_n$, prejudicial for a high light efficiency, was partly due to the high polarity of HCL.

The inventive use of non-polar atoms or molecules makes it possible to optimize the formation of complexes or mixed aggregates of type $R_m$-$YX_n$, with m and n being positive integers. In particular and contrary to the prior art, ion-molecule reactions are not very probable due to the small number of collisions in the supersonic flow during electric excitation.

Moreover, the formation of homogenous complexes of type $R_2$ in the normal state is also not very probable due to the fact that mixed complexes R-XY have a higher and therefore more stable bond energy. For example, the bond energy of $Xe_2$ is $\simeq 200$ cm$^{-1}$, the energy of $(CL_2)_2$ is $\simeq 250$ cm$^{-1}$ and that of the $XeCL_2$ complex is $\simeq 400$ cm$^{-1}$.

The process according to the invention is applicable to a large number of reactive gases. In particular, the reagent R can be a rare gas such as argon, krypton, xenon, a metal vapour and in particular a vapour of mercury, cadmium, zinc, tellurium, potassium or a slightly polar or non-polar polyatomic gaseous molecule such as COS, $NF_3$, $CO_2$, $OF_2$, $N_2O$, $O_2$.

The reagent XY can also be formed by a rare gas such as argon, krypton, xenon, a metal vapour such as a vapour of mercury, cadmium, zinc, potassium, tellurim, etc., or a polyatomic gaseous molecule such as COS, $N_2O$, $O_2$, COS, $NF_3$, $OF_2$ and preferably a polyatomic molecule, whereof at least one of the atoms is a halogen, such as e.g. $CL_2$, $Br_2$, $F_2$, $CH_3X$, $CH_2X_2$ or $C_2H_5X$, in which X represents CL, Br or F.

The R-XY gas pairs usable are in particular those described in the articles by B. Fontaine and J.J. Ewing.

Usable buffer gases are a rare gas such as argon, neon, krypton, xenon, helium or a mixture of these gases, or a metal vapour such as a mercury vapour. Advantageously R and M are rare gases and XY represents $CL_2$, $Br_2$ and $F_2$. In particular, R represents Xe, XY represents $CL_2$ and M represents helium, which makes it possible to obtain the excimer XeCL* by direct excitation of the complex Xe-$CL_2$.

Another preferred gas mixture is mercury for R, $CH_3CL$ for XY and helium for M.

According to the invention, the compression of the gaseous mixture is performed at a pressure of 1 to 5 MPa and expansion is performed up to a pressure below 135 Pa (1 Torr). This pressure range cannot be reached with a conventional system, where the collisions are necessary for the information of the excimers.

In the particular case of the formation of the excimer XeCL*, it is preferable to compress the gaseous mixture to approximately 2 MPa in order to aid the formation of the Van der Waals complex Xe-$CL_2$ compared with other complexes liable to be formed.

The invention also relates to an apparatus for performing the abovedescribed process. According to the invention, this apparatus comprises a compression chamber, means for compressing the gaseous mixture in the compression chamber, an expansion chamber communicating by at least one opening with the compression chamber, means for producing within the expansion chamber a pressure well below that prevailing in the compression chamber, the pressure difference between the compression and expansion chambers, the surface of the opening and the volume of the expansion chamber being such that the gaseous mixture entering the expansion chamber undergoes a supersonic adiabatic expansion with a Mach number at least equal to 10, and means for producing an electric discharge in the expansion chamber downstream of the opening.

According to the invention, this apparatus can be used as a laser operating in continuous or pulsed manner with a very high repetition frequency (approximately 1 kHz), unlike in the case of the prior art apparatus.

Moreover, this laser apparatus is not necessarily equipped with a system for amplifying the light emitted by the excimer due to the high power level of the latter. If necessary, it can be equipped with a wavelength selector for reducing the spectral width of the light.

The laser apparatus according to the invention can be used with all the aforementioned reactive gases. The excimers which can be formed with the laser apparatus according to the invention and their corresponding laser emissions are more particularly given in the aforementioned articles by B. Fontaine and J.J. Ewing.

BRIEF DESCRIPTION OF THE DRAWINGS

Other characteristics and advantages of the invention can be gathered from the following description of non-limitative embodiments and the attached drawings, wherein show:

FIG. 3 a view along plane III—III of the active part of the laser of FIG. 2.

FIG. 4 a longitudinal sectional view of a variant of the active part of the continuous laser according to the invention.

FIG. 5 an overall diagrammatic view of a pulsed laser according to the invention.

DESCRIPTION OF THE PREFERRED EMBODIMENT

Figure 2:
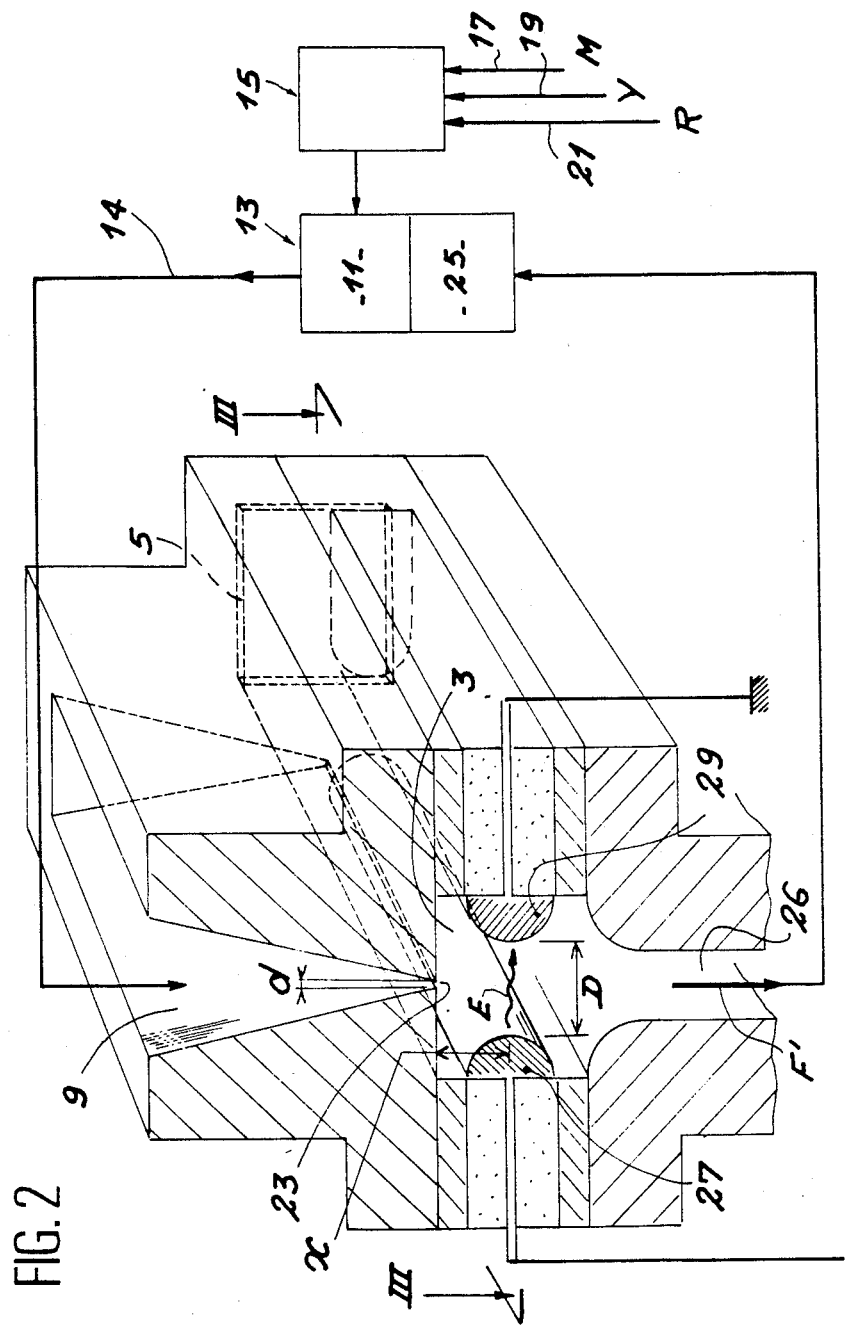
FIG. 2 an overall view of a continuous excimer laser according to the invention, the active part of the laser being in perspective and cross-section, whilst the recycling of the gases is shown diagrammatically.

With reference to FIGS. 2 and 3, a continuous excimer laser according to the invention comprises a resonant cavity 3 having at a first end a total reflection mirror 5 and at the other end an exit window 7, e.g. of quartz, permitting the passage of 95% of the light emitted in cavity 3. This laser cavity, which is e.g. parallelepipedic, constitutes an expansion chamber for the gaseous mixture which is the cause of the laser emission.

The gas responsible for the laser effect is firstly introduced into a compression chamber 9 with the aid of a compression stage 11 of a compressor 13 having a flow rate of approximately 5000 m$^3$/h. The compression stage 11 makes it possible to compress the gaseous mixture which is the precursor of the laser effect to pressures between 1 and 5 MPa. A pipe 14 carries the compressed gaseous mixture from the compressor chamber 9.

The gaseous mixture to be compressed is stored in a mixing reservoir 15 linked with the compression stage of compressor 13. Pipes 17, 19 and 21 supply reservoir 15 with gas or vapour R, gas or vapour Y and buffer gas.

The gaseous mixture compressed in compression chamber 9 is introduced into expansion chamber 3 with the aid of a slit 23 having an extremely limited width $\underline{d}$ of typically 200 $\mu$m. This slit 23 is located in the median plane of activity 3.

The gaseous mixture leaving compression chamber 9 through slit 23 undergoes a supersonic adiabatic expansion, whose Mach number is between 10 and 100. To this end, the minimum distance D of the expansion chamber 3 must be approximately 20 times greater than the width d of slit 23. Moreover, the initial pressure of cavity 3 must be well below that prevailing in compression chamber 9. In particular, the pressure in the expansion chamber is below 135 Pa (<1 Torr) and is e.g. between 13 and 135 Pa (10$^{-1}$ to 1 Torr).

This relatively low pressure in the expansion chamber 3 is produced by a vacuum pump constituting a second stage 25 of compressor 13. A pipe 26 issuing into cavity 3 facing slit 23 makes it possible to move the expanded gas from the cavity to the vacuum pump 25.

According to the invention, the supersonic expansion with a Mach number exceeding 10 of a compressed gas mixture M+R+XY makes it possible to form a Van der Waals complex R-XY.

Figure 1:
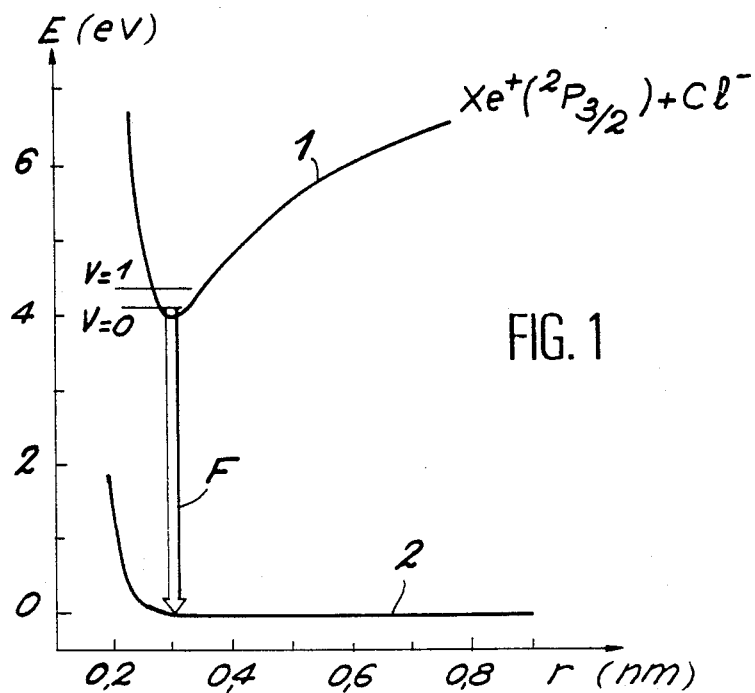
FIG. 1 already described, the potential curves of Xe-CL.

Electrodes 27 and 29 respectively connected to high voltage and earth are located within the expansion chamber 3 and make it possible to produce an electric discharge, symbolized by arrow E, oriented perpendicular to the flow of the gaseous mixture symbolized by arrow F'. This electric discharge E makes it possible to transform the Van der Waals complex R-XY into the excimer RY*. For R representing Xe and XY representing $CL_2$, the excimer obtained is XeCL*, whose potential curves are shown in FIG. 1.

The relatively high gas flow in a laser according to the invention ensures a constant replenishment of the active medium, thus permitting a continuous light emission, which is represented by the arrow L (FIG. 3) and passes out through the window 7 of the laser cavity.

According to the invention, the electric discharge E is produced downstream of slit 23 and in a region where the density or pressure of the gas is relatively low, thus making it possible to use a voltage between 5 and 10 kV. The distance x from slit 23 at which the electric discharge E takes place is typically 4 mm. The distance x is approximately 20 times greater than the width of slit 23.

Electrodes 27 and 29 producing the electric discharge E in the cold zone (approximately 10° K) of expansion chamber 3 can have all possible forms and in particular can be in the form of two solid cylinders with a circular base, in the case of a continuous slit 23.

In the manner shown in FIG. 4, it is also possible to use several electrodes 27a connected in parallel to earth and several electrodes 27a connected in parallel to high voltage for producing several electric discharges. This is in particular the case when the communication between the compression chamber 9 and the expansion chamber 3 of the laser is ensured by several slits 23a or holes located in series in the median plane of cavity 3. This plurality of slits or holes 23a makes it possible to produce several compressed gas jets in series.

According to the invention, it is also possible to produce a pulsed laser having a laser pulse repetition frequency exceeding 1 kHz. Such a laser is diagrammatically shown in FIG. 5. This laser differs from that described hereinbefore through the use of a pulsed control valve 36, e.g. located downstream of the compression stage 11 of compressor 13. Valve 36 is e.g. a rotary drum equipped with a slit 38 permitting the passage of the compressed gas when said slit is located in the axis of pipe 14, linking the compressor stage 11 with the compression chamber 9.

The rotation speed of the drum 36 can be controlled by a known tachometer system 40 supplying an appropriate electric signal to a thyristor-type spark gap 42 connected in parallel between discharge electrodes 27b and 29b respectively connected to high voltage and earth. The discharge of spark gap 42 leads to an electric discharge between electrodes 27b and 29b in pulsed manner, said discharge being synchronized with the pulsed valve 36.

An apparatus similar to that described relative to FIGS. 2 and 3, with a supersonic flow using a diameter 200 μm circular nozzle has made it possible to observe the emission of the XeCL* excimer at 308 nm with the gaseous mixture $He/CL_2/Xe$ in a ratio of 100:1:1.

The pressure of the gases in compression chamber 9 was 14 bars and the pressure in the expansion chamber 3 was 13.5 Pa ($10^{-1}$ Torr). The distance x between the nozzle and the electric discharge was 4 mm and with width d of the nozzle was 200 μm, which corresponds to a x:d ratio of approximately 20 and to a Mach number of approximately 24. The electric discharge was ensured with a voltage of 6 kV.

Figure 6:
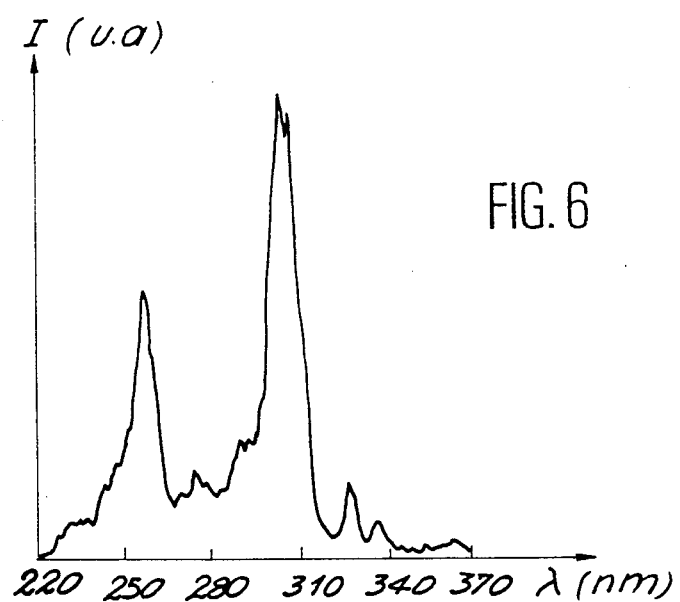
FIG. 6 the emission spectrum of a He/Xe/$CL_2$ mixture excited according to the process of the invention.

An example of the emission spectrum obtained under these experimental conditions is shown in FIG. 6. The excitation of the Van der Waals complex $Xe-CL_2$ formed during the expansion selectively gives rise to the excimer XeCL* in its electronic state B, which is the sole precursor of laser emission at 308 nm corresponding to the electric transition XeCL* $(B,V \lesssim 10) \rightarrow X$ (cf. FIG. 1).

It is pointed out that the excimer XeCL* in state B is directly formed in relatively cold manner ($V \lesssim 10$) unlike what happens with the prior art apparatuses, in which the collisional relaxation is necessary for populating the low vibrational levels of state B from a mixture of vibronic states B and C.

The spectral width at the mid-height of the emission at 308 nm, designated A, is approximately 10 nm. The other lines observed can be attributed to the electronic transitions of $CL_2$, which is in particular the case with the emission at 258 nm. The latter can be greatly reduced and become negligible compared with the laser with the emission at 308 nm by increasing the pressure of the compressed gases to 20 bars and higher under the aforementioned conditions.

A mixture of $He/Hg/CH_3CL$ in a ratio 100:1:1 makes it possible to obtain an emission of the excimer HgCL* (B).

The process for obtaining an excimer according to the invention makes it possible to produce continuous or pulsed lasers with a high recurrence, contrary to the prior art processes and the performance characteristics thereof (efficiency, power, simplicity of use and ease of producing the discharge at low voltage) offer real advantages.

We claim:

1. A process for obtaining an excimer able to chemically dissociate during its deexcitation by a light emission, comprising the following stages:

compression of a gaseous mixture containing R, XY and M for obtaining a compressed mixture in which R and XY are independently chosen in the group consisting of a rare gas atom, a metal atom and a polyatomic molecule, M representing a buffer gas, supersonic adiabatic expansion of the compressed mixture with a Mach number at least equal to 10 leading to the formation of a Van der Waals complex of formula R-XY immersed in the buffer gas, the bond energy of the complex R-XY being at least equal to the bond energy of the compounds of formula R—R and XY—XY, and direct excitation of the Van der Waals complex by an unassisted electric discharge leading to an excimer of formula RY* in which Y represents a part of XY and * indicates an excited state of RY.

2. Process according to claim 1, characterized in that the electric discharge (E) is produced perpendicular to the flow direction (F') of the expanded gaseous mixture.

3. Process according to claim 1, characterized in that the electric discharge (E) is produced downstream of the expansion in a region (x), where the Mach number is >10.

4. Process according to claim 1, characterized in that the compression of the gaseous mixture is performed at 1 to 5 MPa.

5. Process according to claim 1, characterized in that R is chosen in the group consisting of Ar, Kr, Xe and Hg.

6. Process according to claim 1, characterized in that XY is a non-polar polyatomic molecule.

7. Process according to claim 1, characterized in that XY is a polyatomic molecule, whereof at least one of the atoms is a halogen.

8. Process according to claim 1, characterized in that XY is chosen in the group consisting of $CL_2$, $Br_2$, $F_2$, $CH_3X$, $CH_2X_2$ or $C_2H_5X$, in which X is in the group consisting of CL, Br and F.

9. Process according to claim 1, characterized in that M represents at least one rare gas.

10. Process according to claim 1, characterized in that R represents Hg, XY represents $CH_3CL$ and M represents He.

11. Process for obtaining the excimer $XeCL^*$ according to claim 1, characterized in that R represents Xe, XY represents $CL_2$ and M represents He.

12. Apparatus for performing a process according to claim 1, characterized in that it comprises a compression chamber (9), means (11) for compressing the gaseous mixture containing R, XY and M in the compression chamber (9), an expansion chamber (3) communicating by at least one opening (23,23a) with the compression chamber (9), means (25) for producing within the expansion chamber (3) a pressure well below that prevailing in the compression chamber (9), the pressure difference between the compression and expansion chambers, the surface of the opening and the volume of the compression chamber being such that the gaseous mixture entering the compression chamber undergoes a supersonic adiabatic expansion with a Mach number at least equal to 10 and means (27, 29, 27a, 29a) for producing an electric discharge (E) in the expansion chamber (3), downstream (x) of the opening (23,23a).

13. Power laser emitting in the range from visible to ultraviolet having a resonant cavity (3) containing an excimer, characterized in that the excimer is obtained by the process according to claim 1.

14. Power laser emitting at 308 nm having a resonant cavity (3) containing the excimer $XeCL^*$, characterized in that the excimer is obtained by the process according to claim 11.

15. A process for obtaining an excimer able to chemically dissociate during its deexcitation by a light emission, comprising the following stages:

compression of a gaseous mixture containing R, XY and M for obtaining a compressed mixture in which R is chosen in the group consisting of a rare gas atom, a metal atom and a polyatomic molecule, XY is a polyatomic molecule and M represents a buffer gas, supersonic adiabatic expansion of the compressed mixture with a Mach number at least equal to 10 leading to the formation of a Van der Waals complex of formula R-XY immersed in the buffer gas, the bond energy of the complex R-XY being at least equal to the bond energy of the compounds of formula R—R and XY—XY, and direct excitation of the Van der Waals complex by an unassisted electric discharge leading to an excimer of formula $RY^*$ in which Y represents a part of XY and * indicates an excited state of RY.

16. Process according to claim 15, characterized in that the compression of the gaseous mixture is performed at 1 to 5 Mpa.

17. Process according to claim 15, characterized in that R is chosen in the group consisting of Ar, Kr, Xe and Hg.

18. Process according to claim 15, characterized in that XY is a non-polar polyatomic molecule.

19. Process according to claim 15, characterized in that XY is a polyatomic molecule, whereof at least one of the atoms is a halogen.

20. Process according to claim 15, characterized in that M represents at least one rare gas.

* * * * *

UNITED STATES PATENT AND TRADEMARK OFFICE
CERTIFICATE OF CORRECTION

PATENT NO. : 4,849,983

DATED : July 18, 1989

INVENTOR(S) : Boivineau et al.

Page 1 of 2

It is certified that error appears in the above-identified patent and that said Letters Patent is hereby corrected as shown below:

Under "Other Publications", line 1, delete "Speed" and insert --Specific--.

Under "Abstract", delete first sentence.

Column 1, line 53, delete "electron" and insert --electronic--.

Column 2, line 10, delete "functional" and insert --function--.

Column 2, line 55, delete "tempeerature" and insert --temperature--.

Column 4, line 28, insert --of-- after "is" (1st occurrence).

Column 4, line 34, delete "he" and insert --the--.

Column 4, line 64, delete "homogenous" and insert --homogeneous--.

Column 5, line 12, delete "tellurim" and insert --tellurium--.

Column 5, line 35, delete "information" and insert --formation--.

Column 5, line 42, delete "abovedescribed" and insert --above-described--.

Column 6, line 44, after "compressor" insert --to compression--.

UNITED STATES PATENT AND TRADEMARK OFFICE
CERTIFICATE OF CORRECTION

PATENT NO. : 4,849,983
DATED : July 18, 1989
INVENTOR(S) : Boivineau, et al

It is certified that error appears in the above-identified patent and that said Letters Patent is hereby corrected as shown below:

Column 7, line 14 after "RY*" insert --.--.

Signed and Sealed this

Fifth Day of June, 1990

Attest:

HARRY F. MANBECK, JR.

*Attesting Officer*   *Commissioner of Patents and Trademarks*